Aug. 31, 1943.   L. W. ATCHISON   2,328,406
PRESSURE RELIEF EXPANSIBLE RESERVOIR FOR CONDITION
RESPONSIVE INDICATING DEVICES
Filed Sept. 12, 1941
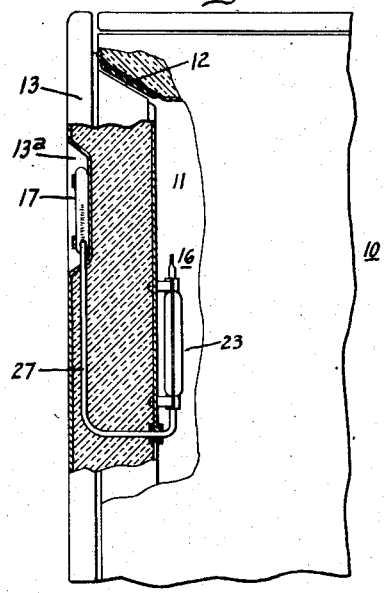
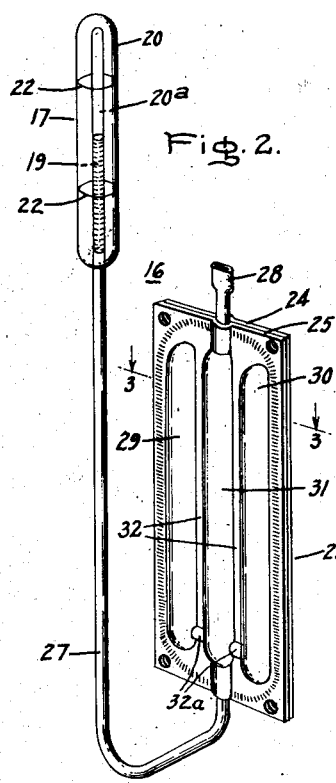
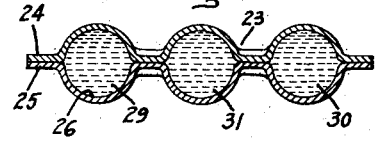
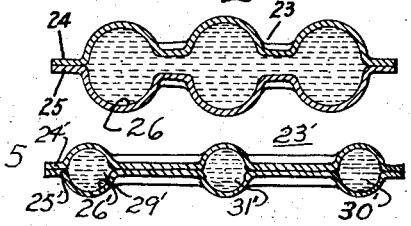
Inventor:
Leonard W. Atchison,
by Harry E. Dunham
His Attorney.

Patented Aug. 31, 1943

2,328,406

UNITED STATES PATENT OFFICE 2,328,406

PRESSURE RELIEF EXPANSIBLE RESERVOIR FOR CONDITION RESPONSIVE INDICATING DEVICES

Leonard W. Atchison, Schenectady, N. Y., assignor to General Electric Company, a corporation of New York Application September 12, 1941, Serial No. 410,538

10 Claims. (Cl. 73—369)

My invention relates to expansible reservoir means for use with devices, such as thermometers, designed for normal operation within a range different from that encountered under special conditions to which the device may be subjected.

This is a continuation-in-part of my copending application Serial No. 373,454, filed January 7, 1941, and assigned to the same assignee as the present invention.

Objects and advantages of my invention will become apparent as the following description proceeds, and the features of novelty which characterize my invention will be pointed out with particularity in the claims annexed to and forming a part of this specification.

For a better understanding of my invention reference may be had to the accompanying drawing in which Fig. 1 is a partial view of a refrigerator cabinet illustrating the use of one embodiment of my invention; Fig. 2 is an enlarged perspective view of the thermometer illustrated in Fig. 1; Fig. 3 is a sectional view taken along the line 3—3 of Fig. 2; Fig. 4 is a view similar to Fig. 3 illustrating the position of the reservoir in the stressed condition of the device; and Fig. 5 illustrates another embodiment of my invention.

Liquid filled devices subjected to varying pressure or temperature are familiar to the art. For example, thermometers have been used to indicate temperature and bellows pressure responsive devices have been used in a number of applications. In many hermetically sealed devices using liquid filled bellows or thermometer tubes, the problem is encountered of overstressing the bellows or thermometer during abnormal conditions, as during shipment, for example in the case of a refrigerator thermometer, when excessive temperatures are encountered. In accordance with my invention, I have provided a new and improved pressure relief means for use with such devices. In the drawing I have illustrated a form of my invention as it might be applied to a refrigerator cabinet.

Referring to Fig. 1 there is illustrated a refrigerator cabinet 10 of the domestic type having a food shortage compartment 11 provided therein, an access opening 12 thereto being arranged to be closed by a suitable heat insulated door 13. In order to provide refrigeration within the storage compartment 11, there is provided a suitable refrigerant circulating system including a cooling element or refrigerant evaporator, not shown. In order to apprise the user of the refrigerator of the temperature prevailing within the food storage space, there is provided a temperature responsive device 16 which embodies the principles of my invention.

As best seen in Fig. 2, the temperature indicating device or thermometer 16 includes an indicating portion 17 suitably arranged to enable the user of the refrigerator to observe conveniently the height of the liquid column 19 in the liquid chamber 20a of the tube 20, as in a recess 13a in the outer surface of the door 13, for example, and a temperature sensitive portion 23 located within the storage compartment.

In normal operation, the storage compartment of the refrigerator will be maintained at a temperature in the neighborhood of 45° F. Therefore, the indicating portion 17 is arranged so that the liquid level in tube 20 will be approximately midway of suitable indicia or marks 22 which may be inscribed on the glass tube 20. For example, the marks 22 may indicate 40° F. and 50° F., respectively, or may be employed merely to indicate desirable temperature limits. In order to provide an indication which will be readily visible at a distance from the refrigerator and also to provide a substantial change of level in the bulb 20 for a relatively small change of temperature within the compartment 11, I have provided the temperature-sensitive portion of the device with a relatively large volume as compared to the volume of the portion 17, and have chosen the glass tube 27 communicating between the reservoir 23 and the indicating portion 17 as well as the chamber 20a in the glass bulb 20 of a relatively large diameter. The liquid-containing chamber of the reservoir portion 23 is disposed so that the top thereof is below the indicating range of the indicating portion or, at least, does not extend above the lower limit of the indicating range of the device. Inasmuch as liquid columns which are interconnected will "tend to seek their own level" irrespective of the sizes of the respective branches, the level in the indicating portion of the device will tend to drop by gravity, thus tending to maintain the reservoir portion entirely full of indicating fluid assuming that there is sufficient fluid provided for accomplishing that purpose. With this assumption in mind, any small change of temperature to which the reservoir portion 23 is subjected will cause a change in volume of the fluid in the device. Inasmuch as the reservoir portion is filled with liquid all expansion or contraction takes effect in the indicating portion of the device and therefore the top of the liquid column 19 will move a substantially large distance as compared with the change thereof if the level in both branches of the system were substantially the same height. It will be apparent that if the portion 23 is subjected to a high temperature such as might be encountered during shipment or storage of the refrigerator during hot summer weather, especially in a warm climate, there would be a relatively high pressure developed within the tube of the thermometer due to the excessive temperature to which the thermometer is subjected and insufficient volume available for expansion. In order to minimize the effects resulting from such excess temperature, I have constructed the reservoir 23 so that it can expand to increase its volume.

The reservoir portion 23 of the device comprises a pair of sheet metal walls 24 and 25, respectively, suitably connected together around the marginal edges thereof as by welding, for example, in order to provide a fluid-tight joint. The material from which the walls are formed must be relatively resilient for a purpose to be hereinafter described. Each of the walls is provided with a plurality of spaced-apart indentations 26 illustrated as semi-circular in cross section. As illustrated in the drawing, the indentations 26 are oppositely arranged so that a plurality of chambers or spaces 29, 30 and 31 is formed. Those portions 32 of the walls lying between the indentations are disposed closely adjacent in the normal or unstressed condition of the reservoir in order to provide a mutual support for each other in the normal condition of the reservoir. The central chamber 31 is connected with the chamber 20a of the indicating portion 20 of the device by means of a conduit or tube 27 or other communicating means.

In order to place the device in operation, it must first be charged. In order to accomplish this charging there is provided a charging tube 28 for evacuating the apparatus and charging the device with liquid. During the charging of the device the device itself and the liquid with which it is to be filled should be held at a constant temperature, preferably slightly above the normal range, and after proper evacuation of the thermometer the liquid is introduced under a very slight pressure. Sufficient liquid is supplied to fill the indicating portion to the proper level above the upper indicium or mark, the tube 27 and the chambers 29, 30 and 31. The charging tube is then sealed off and the thermometer then contains the proper amount of liquid for operation at that temperature. When the thermometer is placed in operation at the normal temperature, the liquid column 19 will recede from the upper end of the chamber 20a and the thermometer will read in the normal manner.

By reason of inaccuracies in construction there will usually be sufficient space between the closely adjacent portions of the walls 24 and 25 to permit equalizing flow of the indicating liquid between the chambers. However, in order to insure communication between the chambers 29, 30 and 31, I may provide a pair of indentations providing communication therebetween, as indicated by the numeral 32a.

In case the thermometer is subjected to excessive temperatures, the reservoir portion 23, because of its expansible nature, will expand or flex slightly, the wall portions 32 separating to increase the communication between chambers 29 and 30 and the central chamber 31. As seen from Fig. 4, this expansion will provide additional volume within the reservoir portion, thereby relieving the pressure in the whole system and maintaining the system pressure within reasonable limits.

The reservoir portion is capable of expanding because of its construction but is relatively incapable of collapsing inwardly beyond the normal wall positions because of the multiple points of support between the walls which carry the load when the pressure inside the reservoir portion becomes less than atmospheric. Additional strength is provided by making the transverse cross section of each of the chambers substantially semi-circular in shape. The strengthening effect may further be accentuated, as shown in Fig. 5, by so constructing and arranging the reservoir portion 23' so that the unsupported areas of members 24' and 25' defining the chambers 29', 30' and 31' are relatively small compared to the supported areas extending between the chambers. In this manner, the return of the reservoir portion to the same position after each operation is insured, thereby maintaining accurate calibration of the device even after the device has been subjected to excessive conditions. When the excess condition is relieved, the walls will return to their normal positions as illustrated in Fig. 3.

While I have herein described a specific embodiment of my invention in the form of a thermometer for use with domestic refrigerators, it will be apparent to those skilled in the art that the principles of my invention are applicable to a large number of devices. For example, pressure-responsive liquid-filled bellows may be protected in the manner described above.

In the foregoing description there has been described an arrangement in which the indicating portion is subjected to a temperature substantially higher than that of the temperature sensitive portion. It should be noted that in addition to the effect of gravity the height of liquid columns depends upon the vapor pressure acting on the columns. If the indicating portion of the system is subjected to a sufficiently great temperature, as compared to the reservoir portion, for example, the vapor pressure effect will be sufficient to overcome in part the effect of gravity and under such conditions the temperature indicating and sensitive portions may be on the same level or even disposed with the temperature indicating portion at a lower level than the reservoir or temperature sensitive portion. The important thing is to dispose the indicating portion, so far as the vertical position thereof with respect to the reservoir portion is concerned, so that the vapor pressure and gravity are sufficient in normal operation of the device to keep the level between the upper and lower limits of the range to be indicated and the reservoir portion completely filled with liquid so that all volumetric changes of the liquid within the device will be effective to change the level of the indicating column.

My invention is not limited to thermometers of the type shown. Thermally sensitive elements such as refrigerator control devices employing a temperature responsive liquid for operating a relay may be protected as described herein.

What I claim as new and desire to secure by Letters Patent of the United States, is:

1. In a hermetically sealed device adapted to be subjected normally to temperature, pressure or the like in a predetermined operating range, and having separated vertically spaced apart portions, each including a fluid chamber and means interconnecting said chambers for conducting a fluid therebetween, said device being charged with a condition responsive fluid, the lower of said portions being adapted to be subjected to the temperature, pressure or the like condition being measured, the upper portion having means for indicating the limits of said normal operating range, the top of the lower chamber being disposed no higher than the lower limit of said normal operating range of the fluid in the upper chamber, said device being charged with sufficient fluid to fill the lower chamber and said interconnecting means and to extend into the upper chamber sufficiently to provide an indication within said normal operating range when said device is subjected to conditions within said range, said lower portion being expansible and having a pair of sheet metal walls formed of relatively resilient metal, said walls being arranged in fluid-tight relationship along the marginal edges thereof and being provided with opposed spaced apart indentations to form a plurality of chambers including said lower chamber, the portions of the walls between the indentations lying closely adjacent in the normal or unstressed condition of said lower portion, said walls being constructed and arranged to be normally immovable but being capable of flexing apart to increase the volume of the lower portion when subjected to excessive pressures and thereby relieve the device of further undue increased pressure.

2. In a hermetically sealed device which may be subjected to temperature, pressure or the like in excess of the range to which the device is normally subjected and having an indicating portion including a liquid chamber, an expansible reservoir portion including a liquid chamber subjected to the temperature, pressure or the like to be measured, and interconnecting means communicating between said chambers, said reservoir chamber having a volume substantially larger than the volume of said indicating chamber, said reservoir portion being disposed lower than said indicating chamber so that the upper end of the reservoir chamber is no higher than the lower end of the indicating range of the indicating chamber, said chambers and said interconnecting means being charged with sufficient condition responsive indicating liquid to completely fill the reservoir chamber and extend into the indicating chamber throughout the nromal operating range of the device, said reservoir portion having a pair of sheet metal walls formed of relatively resilient metal, said walls being arranged in fluid-tight relationship along the marginal edges thereof and being provided with opposed spaced-apart indentations to form a plurality of chambers including the aforementioned reservoir chamber, the portions of the walls between the indentations lying closely adjacent in the normal or unstressed condition of said reservoir portion, one of said chambers communicating with said interconnecting means, the remaining chambers communicating with said one chamber in the stressed condition of the device, said walls being so constructed and arranged as to be substantially immovable at the pressures representative of the temperatures, pressures or the like to which the device is normally subjected, and movable apart when subjected to pressures in excess of the predetermined conditions to which the device is normally subjected in order thereby to relieve the device of further increased pressure.

3. In combination with a hermetically sealed temperature responsive device which may be subjected to temperature in excess of that to which the device is normally subjected and having an indicating portion including a liquid chamber, a reservoir portion subjected to the temperature to be measured, means interconnecting said portions, said device being charged with a condition responsive liquid, said reservoir portion having a pair of sheet metal walls formed of relatively resilient metal, said walls being arranged in fluid-tight relationship along the marginal edges thereof and being provided with opposed spaced-apart indentations to form a plurality of chambers, the portions of the walls between the indentations lying closely adjacent in the normal or unstressed condition of said reservoir portion, one of said chambers communicating with said interconnecting portion, the remaining chambers communicating with said one chamber in the stressed condition of the device, said walls being so constructed and arranged as to be substantially immovable at the pressures representative of the temperatures, pressures or the like to which the device is normally subjected, and movable apart when subjected to pressures in excess of the predetermined conditions to which the device is normally subjected in order thereby to relieve the device of further increased pressure.

4. In a hermetically sealed temperature responsive device which may be subjected to temperature in excess of the range to which the device is normally subjetced and having an indicating portion including a liquid chamber, a reservoir portion adapted to be subjected to the temperature to be measured, means interconnecting said chamber and said portion, said device being charged with a condition responsive liquid, said reservoir portion having a pair of sheet metal walls formed of relatively resilient metal, said walls being arranged in fluid-tight relationship along the marginal edges thereof and being provided with opposed spaced-apart indentations forming a plurality of chambers, said indentations being substantially semi-circular in transverse cross section, the portions of the walls between the indentations lying closely adjacent in the normal or unstressed condition of said reservoir portion, one of said chambers communicating with said interconnecting means, the remaining chambers communicating with said one chamber in the stressed condition of the device, said walls being so constructed and arranged as to be substantially immovable at the pressures representative of the temperatures, pressures or the like to which the device is normally subjected, and movable apart when subjected to pressures in excess of the predetermined conditions to which the device is normally subjected in order thereby to relieve the device of further increased pressure.

5. In a hermetically sealed temperature responsive device having an indicating portion including a chamber, a reservoir portion adapted to be subjected to the temperature to be measured, liquid conveying means interconnecting said chamber and said portion, said device being charged with a condition responsive liquid, said reservoir portion comprising a pair of walls formed of resilient sheet metal, said walls being arranged in fluid-tight relationship along the marginal edges thereof and being provided with opposed spaced-apart indentations forming a plurality of chambers, the portions of the walls lying between the indentations being disposed closely adjacent in the unstressed condition of the reservoir portion for providing mutual support for each other, the supported areas being relatively large with respect to the indented areas, one of said chambers communicating with said interconnecting means, the remaining chambers communicating with said one chamber in the stressed condition, said walls being so constructed and arranged as to be substantially immovable at the pressures representative of the temperatures, pressures or the like to which the device is normally subjected, and movable apart when subjected to pressures in excess of the predetermined conditions to which the device is normally subjected in order thereby to relieve the device of further increased pressure.

6. In a device of a type which may be subjected to pressure in excess of that to which the device is normally subjected, an expansible reservoir having a pair of sheet metal walls formed of relatively resilient metal, said walls being arranged in fluid-tight relationship along the marginal edges thereof and being provided with opposed spaced-apart indentations to form a plurality of chambers, the portions of the walls between the indentations lying closely adjacent in the normal or unstressed condition of said reservoir portion, one of said chambers having an opening for communication with a conduit of a structure to which the device may be applied, the remaining chambers communicating with said one chamber in the stressed condition of the device, said walls being so constructed and arranged as to be substantially immovable at the pressures representative of the temperatures, pressures or the like to which the device is normally subjected, and movable apart when subjected to pressures in excess of the predetermined conditions to which the device is normally subjected in order thereby to relieve the device of further increased pressure.

7. In a device of a type which may be subjected to pressure in excess of that to which the device is normally subjected, an expansible reservoir having a pair of sheet metal walls formed of relatively resilient metal, said walls being arranged in fluid-tight relationship along the marginal edges thereof and being provided with opposed spaced-apart indentations forming a plurality of chambers, said indentations being substantially semi-circular in transverse cross section, the portions of the walls between the indentations lying closely adjacent in the normal or unstressed condition of said reservoir portion, one of said chambers having an opening for communication with a conduit of a structure to which the device may be applied, the remaining chambers communicating with said one chamber in the stressed condition of the device, said walls being so constructed and arranged as to be substantially immovable at the pressures representative of the temperatures, pressures or the like to which the device is normally subjected, and movable apart when subjected to pressures in excess of the predetermined conditions to which the device is normally subjected in order thereby to relieve the device of further increased pressure.

8. In a device of a type which may be subjected to pressure in excess of that to which the device is normally subjected, an expansible reservoir comprising a pair of walls formed of resilient sheet metal, said walls being arranged in fluid-tight relationship along the marginal edges thereof and being provided with opposed spaced-apart indentations forming a plurality of chambers, the portions of the walls lying between the indentations being disposed closely adjacent in the unstressed condition of the reservoir portion for providing mutual support for each other, the supported areas being relatively large with respect to the indented areas, one of said chambers having an opening for communication with a conduit of a structure to which the device may be applied, the remaining chambers communicating with said one chamber in the stressed condition, said walls being so constructed and arranged as to be substantially immovable at the pressures representative of the temperatures, pressures or the like to which the device is normally subjected, and movable apart when subjected to pressures in excess of the predetermined conditions to which the device is normally subjected in order thereby to relieve the device of further increased pressure.

9. In a device of a type which may be subjected to pressure in excess of that to which the device is normally subjected comprising a pair of walls formed of resilient sheet metal, said walls being arranged in fluid-tight relationship along the marginal edges thereof and being provided with opposed spaced-apart indentations forming a plurality of chambers, the portions of the walls lying between the indentations being disposed closely adjacent in the unstressed condition of the reservoir portion for providing mutual support for each other, the indented portions of the walls being substantially semi-circular in transverse cross section, and the supported areas being relatively large with respect to the indented areas, one of said chambers having an opening for communication with a conduit of a structure to which the device may be applied, the remaining chambers communicating with said one chamber in the stressed condition, said walls being so constructed and arranged as to be substantially immovable at the pressures representative of the temperatures, pressures or the like to which the device is normally subjected, and movable apart when subjected to pressures in excess of the predetermined conditions to which the device is normally subjected in order thereby to relieve the device of further increased pressure.

10. In a device of a type which may be subjected to pressure in excess of that to which the device is normally subjected, a pair of sheet metal walls formed of relatively resilient metal, said walls being arranged in fluid-tight relationship along the marginal edges thereof and being provided with opposed spaced-apart indentations forming a plurality of chambers, the portions of the walls between the indentations lying closely adjacent in the normal or unstressed condition of said reservoir portion, means having relatively small passages providing communication between said plurality of chambers in the unstressed condition, said walls moving apart when abnormally stressed, thereby providing a larger than normal internal volume in the stressed condition of the device.

LEONARD W. ATCHISON.